United States Patent [19]
Guzovskiy et al.

[11] Patent Number: 5,898,840
[45] Date of Patent: Apr. 27, 1999

[54] MAINTAINING A SEQUENTIAL STORE ORDER (SSO) IN A NON-SSO MACHINE

[75] Inventors: Aleksandr Guzovskiy, Lowell, Mass.; William A. Nesheim, Windham, N.H.; Ashok Singhal, Redwood City, Calif.

[73] Assignee: Sun Microsystems, Inc., Palo Alto, Calif.

[21] Appl. No.: 08/673,049

[22] Filed: Jul. 1, 1996

[51] Int. Cl.[6] .................................................. G06F 15/16
[52] U.S. Cl. ...................... 395/200.56; 395/826; 395/856
[58] Field of Search .................. 395/200.59, 200.78, 395/200.79, 826, 856, 726

[56] References Cited

U.S. PATENT DOCUMENTS 5,483,640   1/1996   Isfeld et al. ........................ 395/200.43
5,657,472   8/1997   Van Loo et al. ......................... 711/158
5,727,209   3/1998   Slingwine et al. ....................... 395/672

*Primary Examiner*—Glenn A. Auve
*Attorney, Agent, or Firm*—James A. Pinto; William J. Kubida; Holland & Hart LLP

[57]  ABSTRACT

In a multiprocessor system, a method, apparatus, and article of manufacture for maintaining the proper sequence of store/write operations between multiple processors to remote I/O devices without requiring changes to application software. A synchronizer is employed to synchronize write operations to the remote I/O device, and the write operations are synchronized individually upon detection and emulation, or as a group upon detection of the release of a mutual exclusion lock.

4 Claims, 8 Drawing Sheets

MAINTAINING A SEQUENTIAL STORE ORDER (SSO) IN A NON-SSO MACHINE

BACKGROUND OF THE INVENTION

1. Field of the Invention

The present invention relates to writing data to remote devices in a multiprocessor computing machine. More particularly, the present invention relates to the maintenance of sequential store order operations in a multiprocessor computing machine.

2. Description of Related Art

One fundamental precept of a computing system is that the operations or instructions provided to the computing system are executed in the same order as passed to the computing system. In other words, programmers of a computer assume that if the operations are encoded in order, the resulting operations as executed by the computer will occur in that sequence. This fundamental assumption about the sequence of resulting operations is particularly important in the context of writing or storing information to the computing system. Conventional software assumes that the computing system maintains the sequential store order (SSO) of the write operations as encoded in a program's source code.

Proper maintenance of the order of sequential store operations is particularly important where these write operations transfer data to peripheral I/O devices, and where the operation of the I/O devices depends on the values previously written to the device. In a multiprocessor computing machine having various processors and peripheral I/O devices attached thereto, the maintenance of the proper sequence of store operations becomes more difficult.

For instance, FIG. 1 illustrates a multiprocessor computing machine, or a scaled shared memory machine, having multiple nodes 20 and 30, connected through communications bus or network 29, with devices 28 and 34 respectively. Node 20 and node 30 are capable of transferring data both to memory and to I/O devices over bus 29 to remote nodes.

Using FIG. 1 as an example, assume that a single CPU of the plurality of CPUs 22 and a single CPU of the plurality of CPUs 32 both desire to write data to device 34 in node 30. Further assume that the sequence of write operations is a write of data A from CPU 22, followed by a write of data B from CPU 32. Because I/O device 34 is local to CPU 32 in node 30, it is possible, due to network latency, that device 34 will first receive data B from CPU 32 before receiving the write request of data A from CPU 22. Under this scenario, the proper sequence of store operations was not maintained in the multiprocessor environment.

Multiprocessor computing systems conventionally utilize a memory based mutual exclusion lock, known as a MUTEX lock, to order memory operations performed by different processors on the system. A MUTEX lock prevents another processor in the multiprocessor system from interfering with the memory location protected by the lock while the lock is active. Once the lock is released, the memory location can be manipulated by other processors in the computing system.

However, the usefulness of such a memory based MUTEX lock to guarantee proper ordering of I/O operations depends on the ordering of memory operations with respect to I/O operations within the computing system. If the I/O operations are not ordered with respect to memory operations, the fact that a MUTEX lock has been released does not imply nor ensure that a prior I/O write operation to a device has completed, or even begun. As explained above, it is possible that some write operations may be processed in a sequence different than the programmer intended.

For these reasons, it is necessary to maintain the proper sequence of sequential store operations to peripheral remote I/O devices in a multiprocessor computing machine.

SUMMARY OF THE INVENTION

In accordance with this invention, the above problems have been solved by a method for maintaining the proper sequence of store operations to the I/O device performed in a computing system. An identifying step identifies a write operation from a node to write data to the I/O device of a remote node. A synchronizing step synchronizes the write operation to the I/O device by notifying other nodes of the write operation, and a waiting step waits until the completion of the write operation before permitting the I/O device from receiving a second write operation from a node.

In one embodiment, the method comprises trapping, emulating, and synchronizing each write to the remote I/O device. This embodiment of the invention is useful in multiprocessor computing systems where it is impossible to intercept or otherwise control the mutex lock.

An identifying step identifies a request from a node to write data to an I/O device at a remote node, the request having a data field and a virtual address. An extracting step extracts from the request the virtual address contained therein, and a translating step translates the virtual address to a physical address. A synchronous emulating step writes the data of the data write operation to the I/O device responsive to the request.

The method further comprises the steps of comparing the physical address to the address of the I/O device to determine if the virtual address identifies said I/O device, and extracts the data field from the request. The data field is then written to the I/O device and the I/O device is synchronized to the completion of the I/O operation by waiting until the I/O device has received and processed the data field before processing a second request to write data to the I/O device.

In another embodiment of the invention, the method comprises detecting each release of the mutual exclusion lock and synchronizing all writes of data to the remote I/O device at that time. This embodiment of the invention is useful in multiprocessor systems where the actions of the mutex can be detected and controlled.

Specifically, an identifying step identifies a request from a node to write data to the I/O device of the node, where the request has a data field and a virtual address. A writing step writes the data field to the memory specified by the virtual address, and a detecting step detects the release access to the mutual exclusion lock. If a second detecting step determines that the mutual exclusion lock protects the I/O device, then a synchronizing step synchronizes the I/O device by waiting until the I/O device has received and processed the data field. A releasing step then releases the mutual exclusion lock on the I/O device after it has received and processed the data field.

The above computer implemented steps in another implementation of the invention are provided as an article of manufacture, i.e., a computer storage medium containing a computer program of instructions for performing the above-described steps.

The great utility of the present invention is that the proper ordering of store operations to remote to remote I/O devices between processors in a multiprocessor system is maintained.

Another utility of the present invention is that the proper sequence of remote I/O store operations is maintained without the need for modification of existing application software written for a multiprocessor computing machine.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of computing system implementing the invention. Accordingly, the logical operations making up the embodiments of the invention described herein are referred to variously as operations, steps, or modules.

Figure 1:
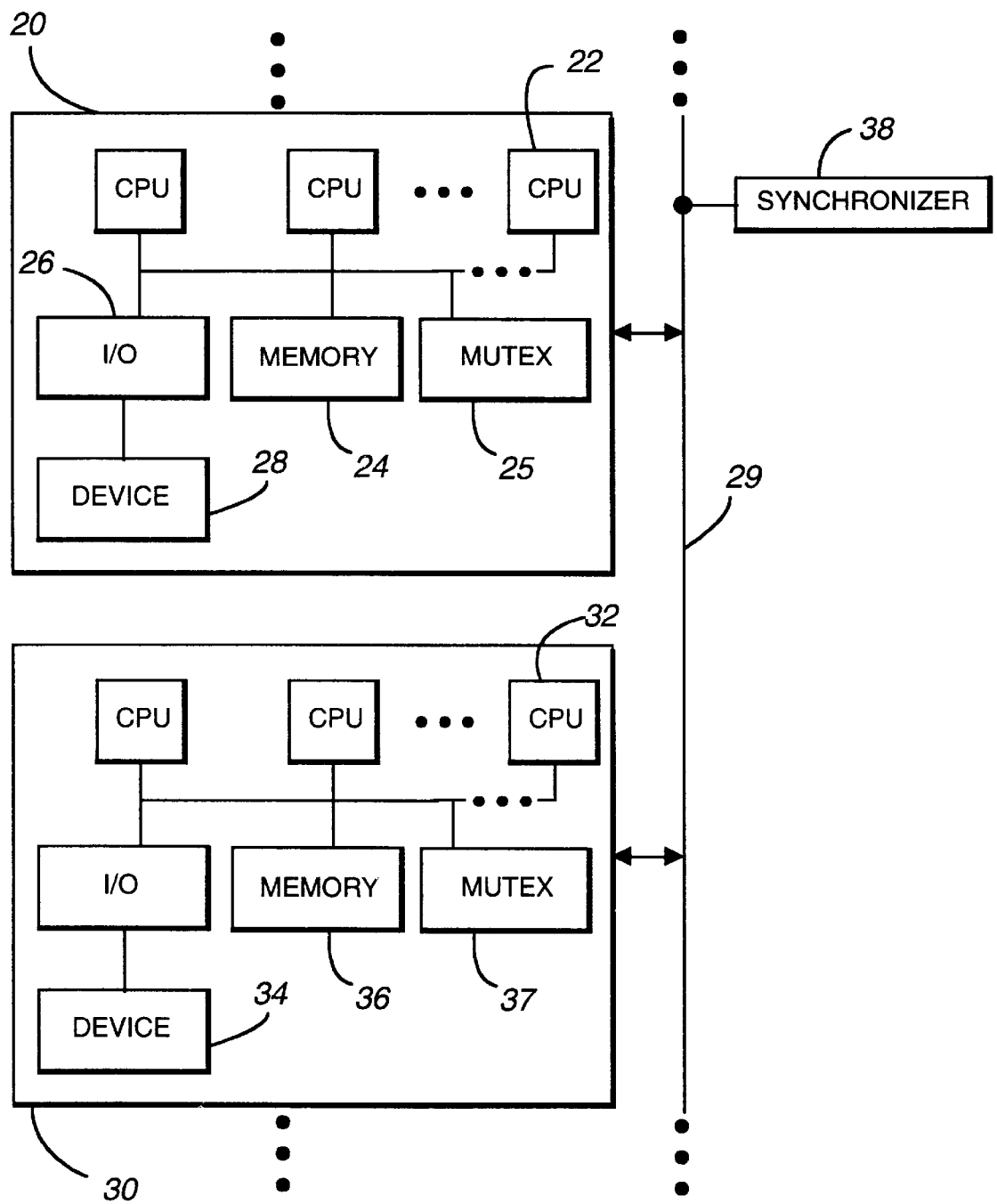
FIG. 1 illustrates a multiprocessor computing machine having two nodes connected over a bus or network.

As previously described, FIG. 1 illustrates a block diagram of a multiprocessor computing machine having a first node 20 and second node 30 connected through a bus or network 29. Each node in the computing system has a plurality of CPUs, memory, and an I/O section for communications with a peripheral device. For example, in node 20, plurality of CPUs 22, having memory 24, further has I/O section 26 connected to peripheral device 28. Because of the shared architecture of the computing system, CPUs 22 can locally access memory 24 or peripheral device 28, as well as remotely access remote memory 36 and remote peripheral device 34 contained within node 30.

In a multiprocessor computing machine, it is necessary that the order of store operations executed by the individual nodes in the computing system occur in the same order as encoded in the software running on the multiprocessor computing machine. Mutex 25, a mutual exclusion lock, is provided within each node of the computing system as a lock on a particular location of memory which prevents interference by another processor, in a multiprocessor machine, of a write of data to a particular memory location. Mutex 25 can be enabled and disabled on a particular address location of an I/O device.

As used throughout this description, the terms "write" and "store" shall be have equivalent meaning of transferring data to a specified device or location (i.e., a remote I/O device) for receipt and processing therein.

The mutex 25 can be implemented as a register in memory with an associated state indicating the availability of resource. If the mutex is active, then no processors are permitted to write to the resource, but if the mutex is inactive, then the first processor to access the resource, and set the mutex state to active, can write to the resource.

Before a processor can write to a memory location protected by mutex 25, the processor must examine the state of the mutex. When the processor in node in a multiprocessor machine wishes to write or store data to an I/O device, lock 92 is enabled, the write operations are performed, and then lock 92 is disabled.

Synchronizer 38 is also shown in FIG. 1. Synchronizer 38 is used to synchronize the write operations to I/O devices in the multiprocessor computing machine. Synchronizer 38 makes any write operation to an I/O device globally visible to all processors and nodes in the computing system. In this manner, processors competing for access to a remote I/O device become aware of the present state of the I/O device.

The present invention ensures the maintenance of the proper sequence of store operations within the multiprocessor computing machine. Two embodiments of the invention are disclosed herein. Both embodiments of the invention utilize write synchronization as discussed above.

In a first embodiment of the present invention, each write operation of remote I/O device is trapped, emulated, and synchronized. This embodiment of the invention is useful in multiprocessor computing systems where it is impossible to intercept or otherwise control the mutex lock.

In a second embodiment of the present invention, each release of the mutual exclusion lock is detected and all writes of data to the remote I/O device are synchronized at that time. This embodiment of the invention is useful in multiprocessor systems where the actions of the mutex can be detected and controlled.

Figure 2:
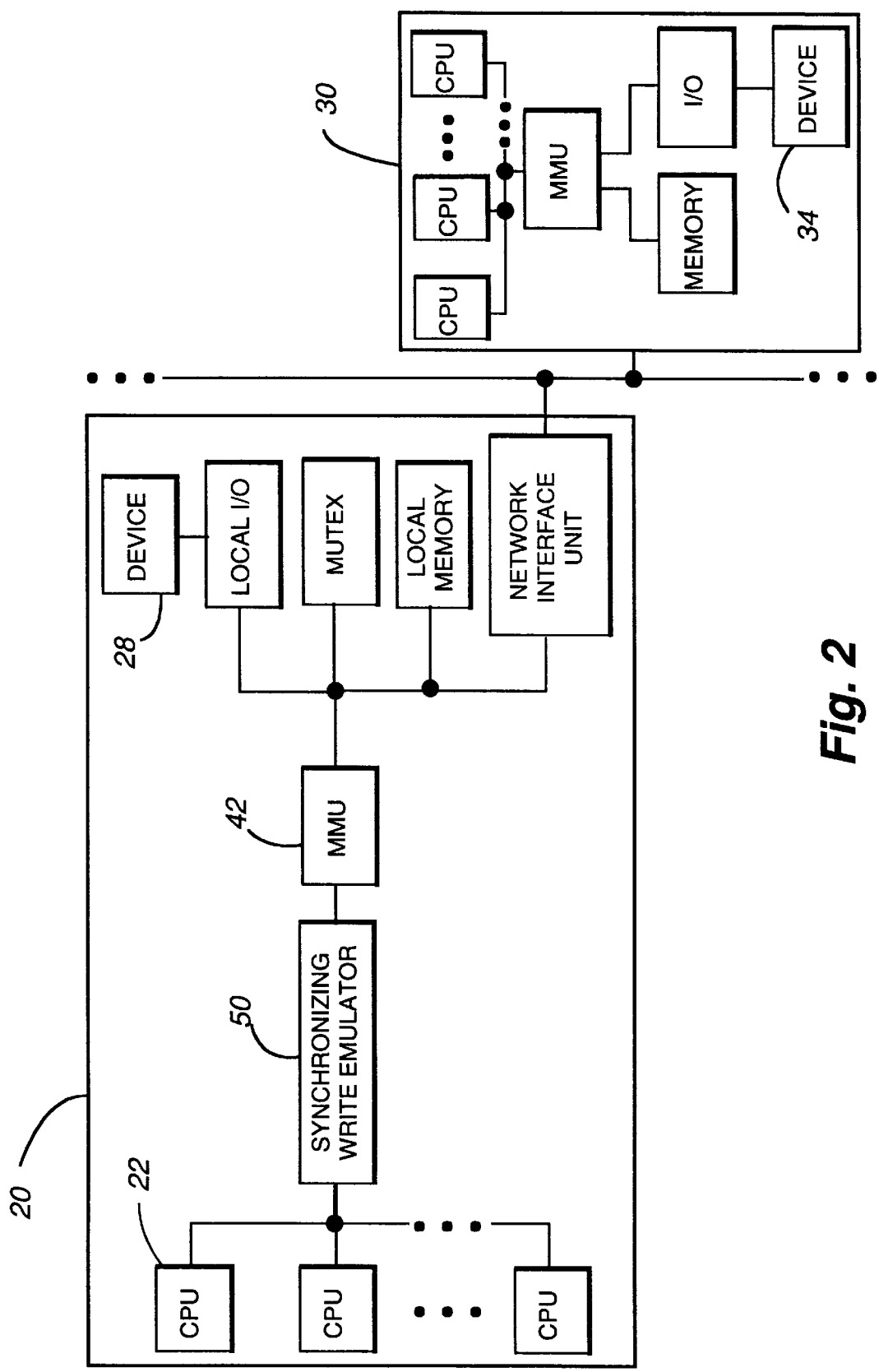
FIG. 2 illustrates a first embodiment of the present invention utilizing a synchronizing write emulator to ensure the proper sequence of store operations executed by a node to a remote I/O device.

FIG. 2 illustrates a first embodiment of the present invention utilizing synchronizing write emulator 50. Synchronizing write emulator 50 intercepts each remote write operation, from a one of the plurality of CPUs 22, to an I/O device, and emulates and synchronizes the individual write operation as it is performed.

Figure 3:
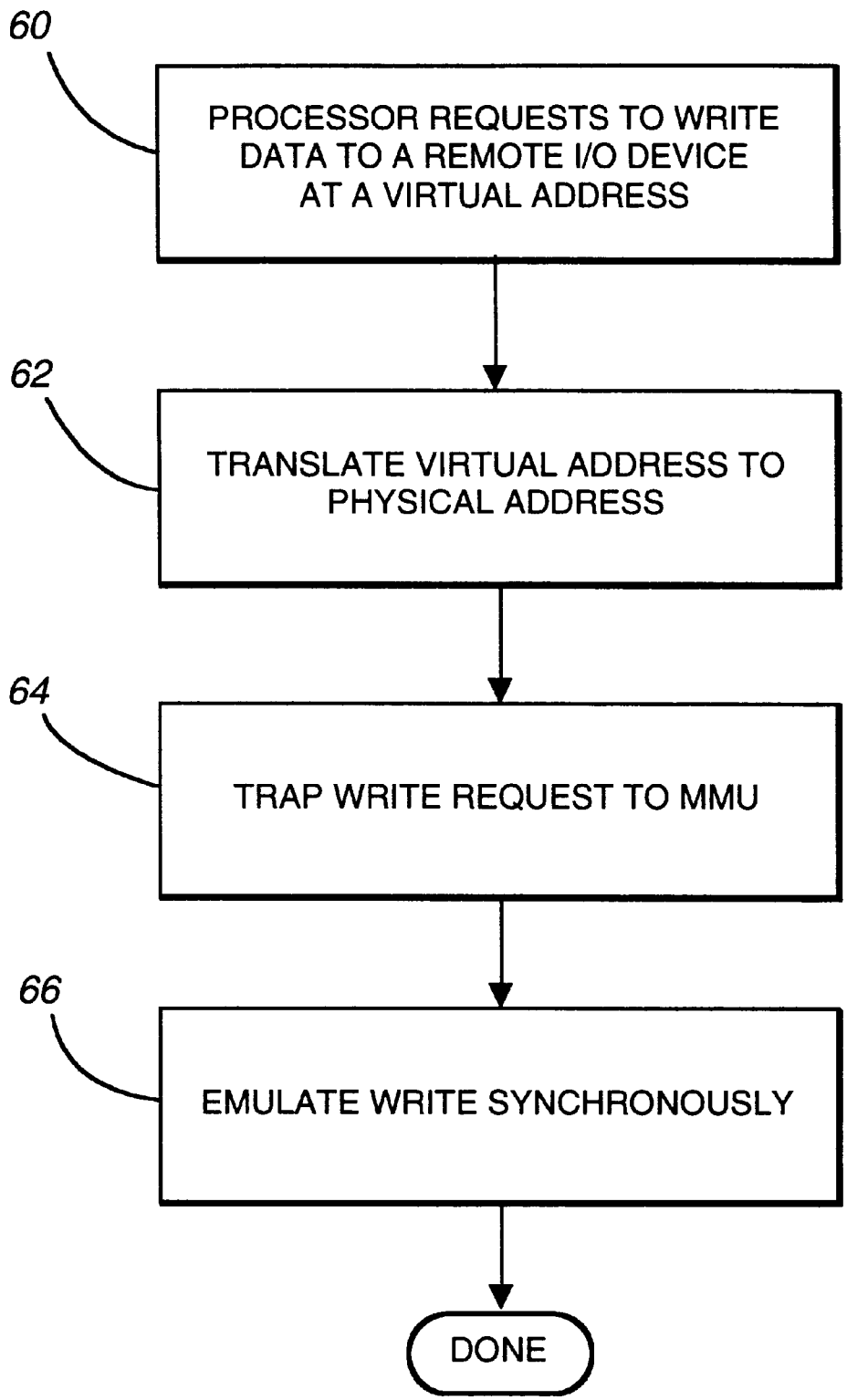
FIG. 3 illustrates the logical operations implemented by the synchronizing write emulator of FIG. 2.
Figure 4:
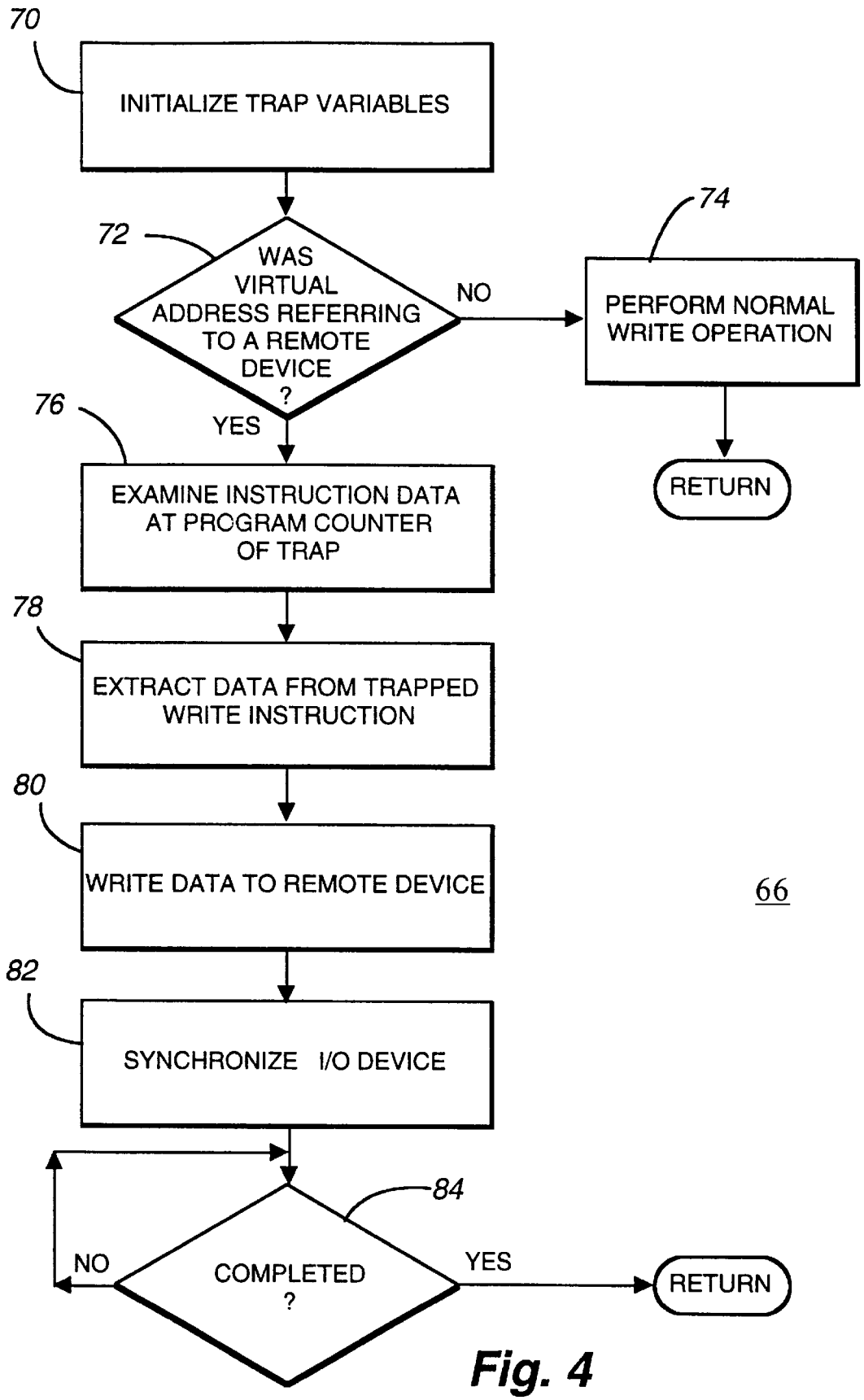
FIG. 4 illustrates the logical operations to emulate a write operation synchronously of operation 66 of FIG. 3.

FIGS. 3–4 illustrate the logical operations performed by synchronizing write emulator 50 of FIG. 2. Referring to operation 60 in FIG. 3, in response to a software instruction, the CPU in a node requests to write data to a remote I/O device at a virtual address. Operation 62 translates this virtual address to the corresponding physical address. Because this physical address corresponds to a remote I/O device located on another node, operation 62 may access a table containing a mapping of all virtual addresses to physical addresses to translate the address from virtual to physical.

Operation 64 then intercepts the write request from the processor to the MMU 42, and operation 66 emulates the write request in a synchronous manner as shown in FIG. 4.

FIG. 4 illustrates the logical operations performed to emulate a write request in a synchronous manner after the write request has been detected and trapped at operation 64 of FIG. 3. Operation 70 initializes the variables of the trap routine. For instance, the memory locations used to store temporary data by operation 66 can be established and initialized.

Decision operation 72 determines if the virtual address provided at operation 60 (FIG. 3) refers to a remote I/O device. If not, then operation 74 performs a normal write operation to the device using the data and address provided by operation 60 (FIG. 3).

If operation 72 determines that the virtual address refers to a remote I/O device, then operation 76 examines the instruction data at the program counter of the trap routine. Operation 78 then extracts the data from the trapped write instruction for use in the emulation of the instruction.

Operation 80 emulates the write instruction by writing the data obtained from operation 78 to the remote I/O device located at the physical address obtained from operation 62 (FIG. 3). The emulation portion of the write of data is now completed.

Operation 82 then synchronizes the peripheral I/O device by ensuring that the data is actually written to the remote I/O device before any subsequent operation can take place. This can be achieved, for example, through loop operation 84 which prevents any subsequent operations to be performed by the present node until the write operation of block 80 has completed. When the remote device has received the data from operation 80, then loop operation 84 releases control and the process is complete.

Alternatively, the synchronization operation could utilize the synchronizer block 38 shown in FIG. 1 to ensure that the present write operation can be seen globally by all processors in the computing system. Hence, in the first embodiment of the invention, each write to a remote I/O device is trapped, emulated, and synchronized. In this manner, the order of the write operations will be preserved since synchronization is ensured for each write operation.

Figure 5:
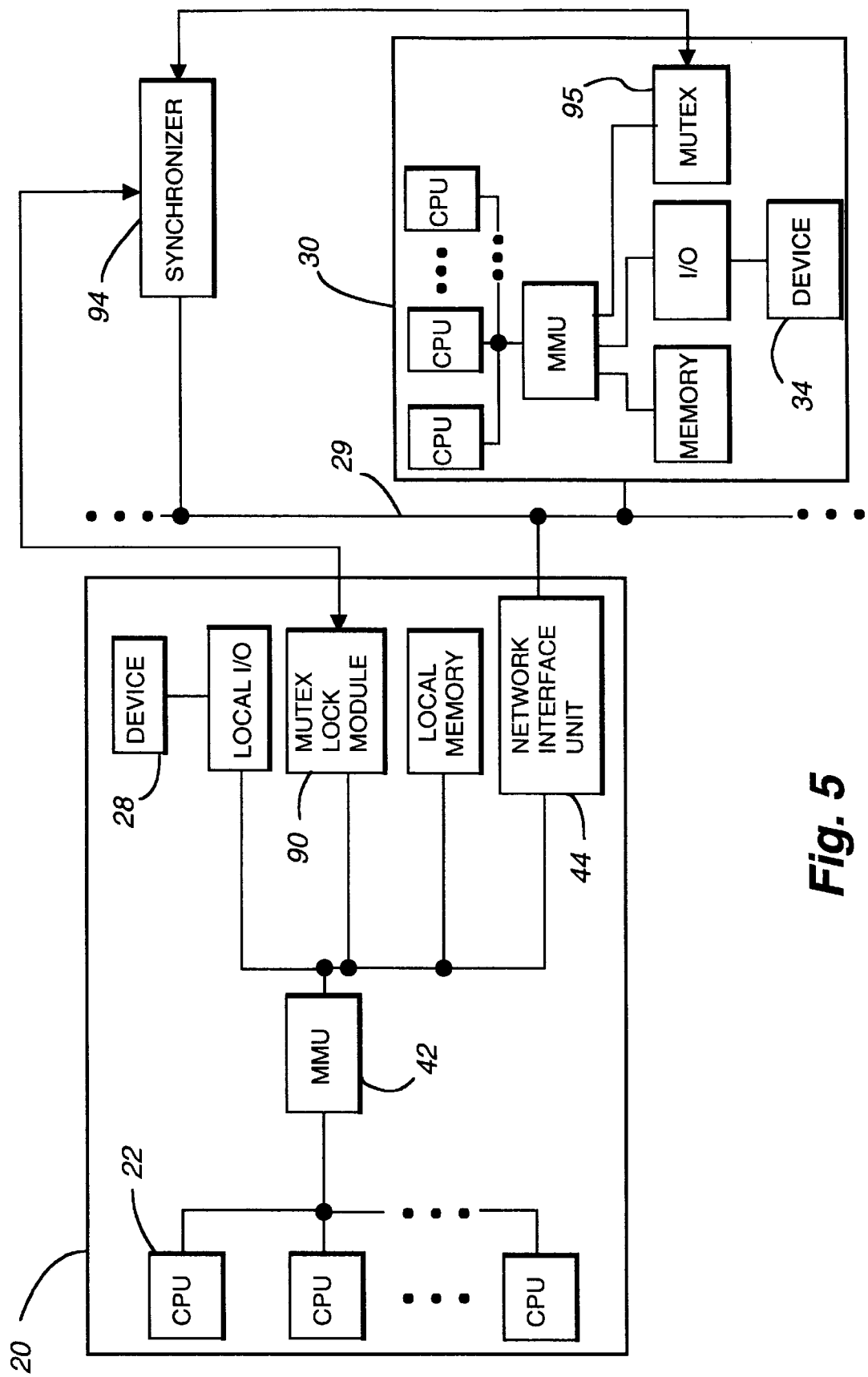
FIG. 5 illustrates a second embodiment of the present invention utilizing a mutual exclusion lock module and a synchronizer to ensure the proper sequence of store operations by a node to a remote I/O device.
Figure 6:
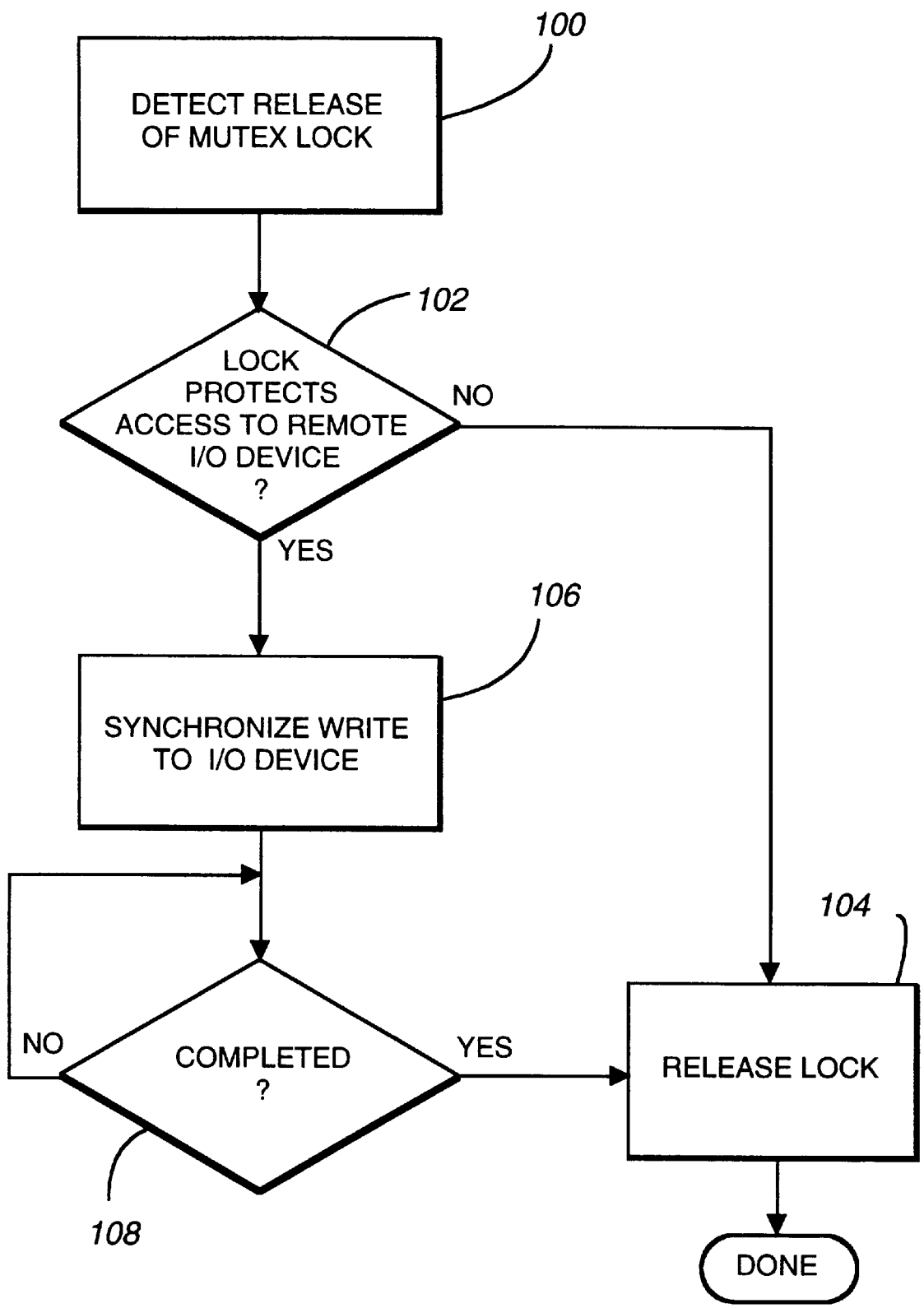
FIG. 6 illustrates the logical operations of the mutual exclusion lock module of FIG. 5.
Figure 7:
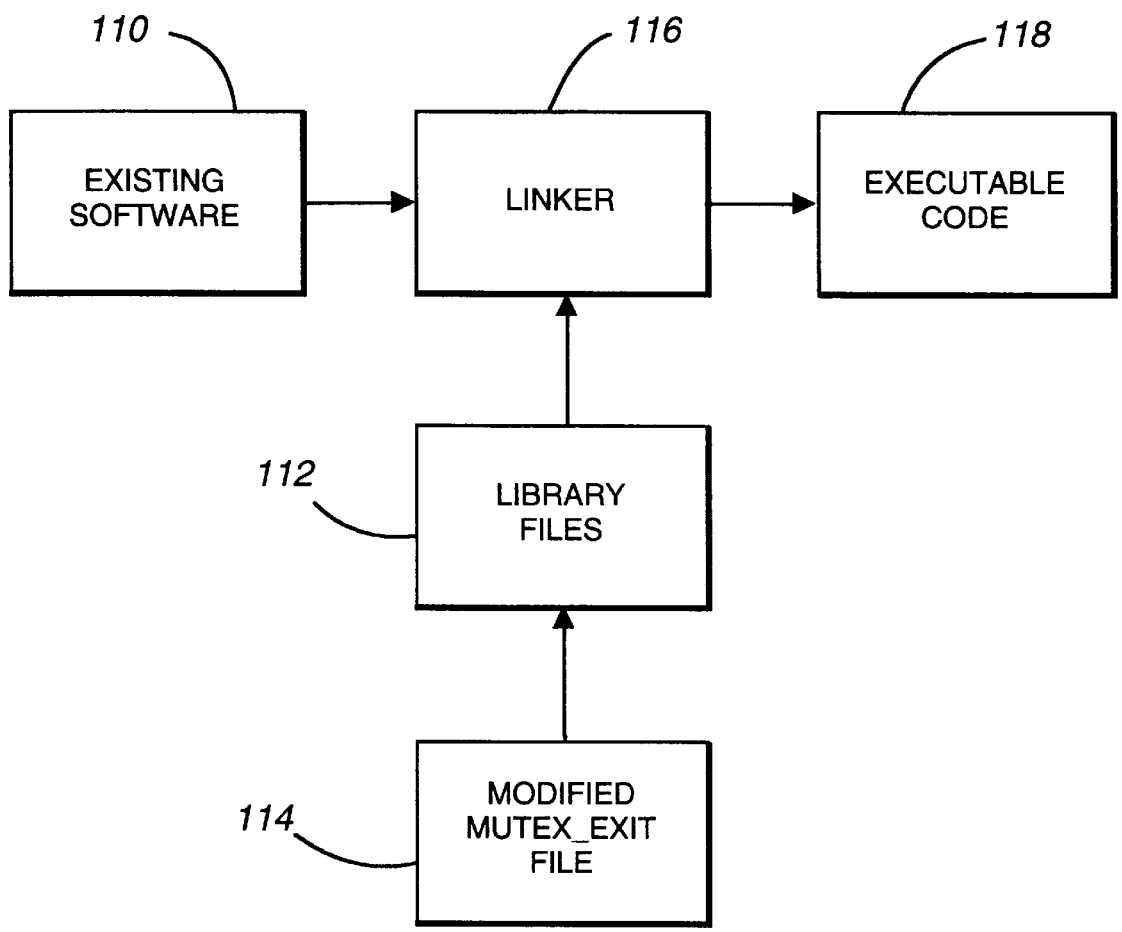
FIG. 7 illustrates the components needed to implement the mutual exclusion lock module in software of the multiprocessor computing machine.
Figure 8:
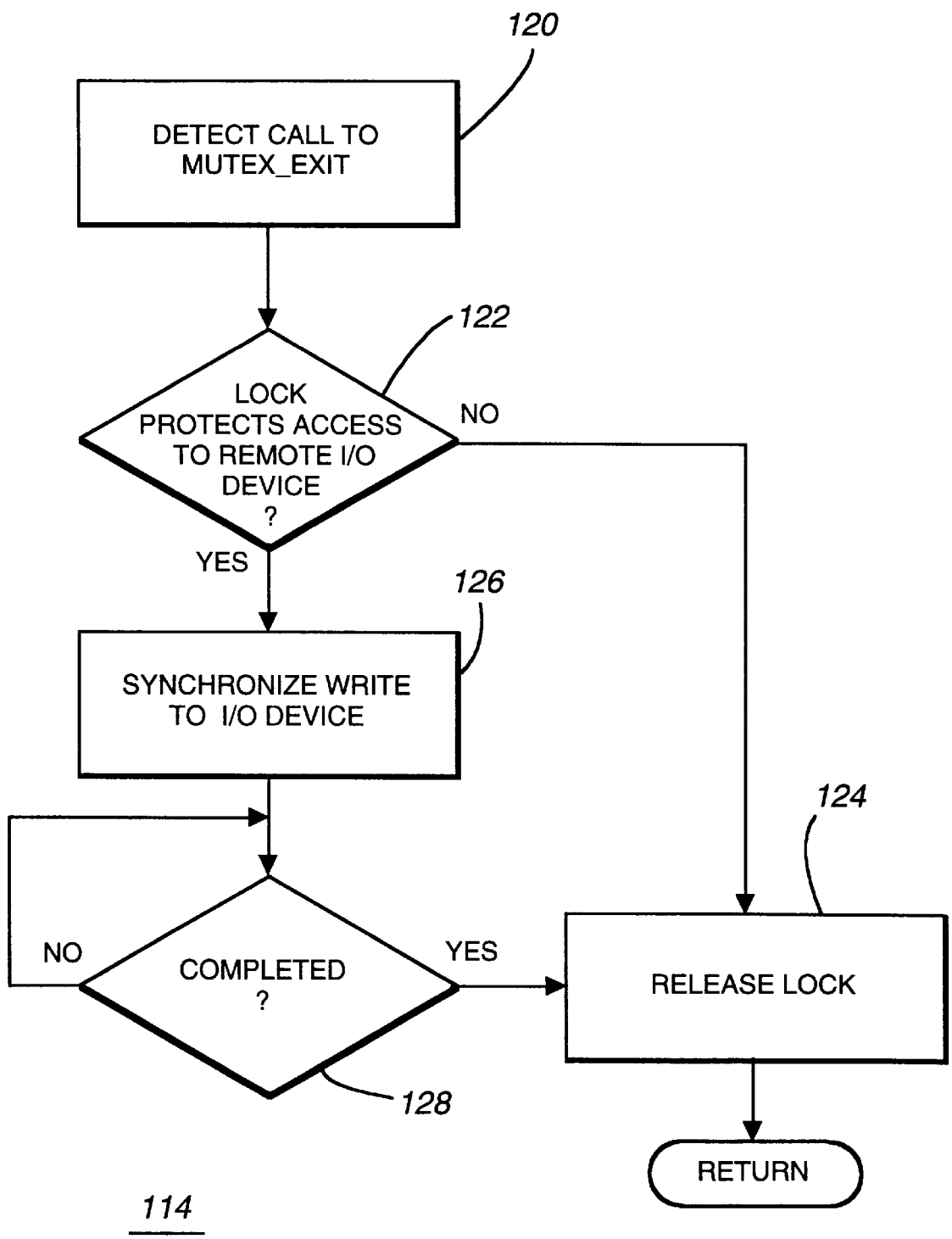
FIG. 8 illustrates the logical operations performed by the MUTEX_EXIT routine to ensure the proper sequence of write operations by a node to a remote I/O device.

FIG. 5 illustrates a second embodiment of the present invention, and FIGS. 6–8 illustrate the operations of this second embodiment. Referring to FIG. 5, a mutual exclusion lock module 90 is provided in node 20 to detect the release of a mutual exclusion lock (not shown) in node 20, and enables a synchronizer 94 to synchronize the write operations performed before releasing the lock from the I/O device 28.

Node 30 is also provided with a mutual exclusion lock module 95 (represented as "MUTEX") for synchronizing write operations to device 34.

Mutual exclusion module 92 contains a lock (shown as 37 in FIG. 1) to a particular location of memory which prevents interference by another processor, in a multiprocessor machine, of a write of data to a particular memory location. A mutual exclusion lock is also known as a MUTEX lock. The lock can be enabled and disabled on a particular address location of an I/O device. When a node in a multiprocessor machine wishes to write or store data to an I/O device, the lock is enabled, the write operations are performed, and then the lock is disabled. For example, the following sequence of operations are illustrative of typical source code to write data to a remote I/O device:

| At processor 0, at t0: | |
| --- | --- |
| MUTEX_ENTER (address) | ;enable lock at address |
| store A, address | ;write data A to remote I/O device |
| store B, address | ;write data B to remote I/O device |
| MUTEX_EXIT (address) | ;release the lock |
| At processor 1, at t1: | |
| MUTEX_ENTER (address) | ;enable lock of device |
| store A, address | ;write data A |
| store B, address | ;write data B |
| MUTEX_EXIT (address) | ;release the lock |

Note that in this example of source code, there are no provisions in the program to independently ensure that the write operations are performed in the proper order.

Both mutual exclusion modules 90 and 95 are connected to synchronizer 94. Once a processor requests to acquire the corresponding mutex to write data to a remote device, acquires the mutex, and writes the data to the I/O device, the processor releases the mutex. According to this embodiment of the present invention, the mutex then calls the synchronizer 94 so that the synchronizer will not grant I/O device access to any processor until the prior operation is complete.

FIG. 6 illustrates the logical operations implemented by MUTEX lock modules 90 and 95 (FIG. 5). MUTEX lock modules 90, 95 act upon the detection of a request to release lock (not shown) upon the memory location of the remote I/O device.

Operation 100 of FIG. 6 detects the request for the release of the mutex lock. Decision operation 102 determines if the lock accessed at operation 100 protects a remote I/O device. If not, then operation 104 releases the lock as requested without any further processing.

If operation 102 determined that the lock involved in the requested release detected by operation 100 protects access to a remote I/O device, then operation 106 synchronizes all of the writes which have taken place in the present node since the lock was enabled. The synchronization operation 106 can be ensured by, for example, loop operation 108 which waits until the remote I/O device has received all of the data, written by the present node, before the lock 92 is released. Once the remote device has received all of the data to be stored, then operation 108 passes control to operation 104 where the lock is released.

Alternatively, the synchronization operation could utilize the synchronizer block 94 shown in FIG. 1 to ensure that the present write operation can be seen globally by all processors in the computing system.

The remote I/O device 34 (FIG. 5) can now be accessed by other nodes in the multiprocessor computing machine. Hence, in the second embodiment of the invention, a set of writes to a remote I/O device are synchronized upon the detection of the release of the mutex. In this manner, the order of the write operations will be preserved since synchronization is ensured for the write operations.

While FIGS. 5–6 describe the operations of MUTEX lock module 90, 95, and synchronizer 94, these operations can be incorporated into the compilation of the software running on the multiprocessor computing machine. FIG. 7 illustrates a block diagram of the mechanism to include the operations of FIG. 8, described below, into existing source code. Block 110 represents existing source code, which under the present invention is not modified except that the library files 112 associated with software 110 can be modified to perform the required operations.

The MUTEX_EXIT routine is a standard library file compiled with source code to form executable code for operation on a multiprocessor computing machine. FIG. 7 illustrates that, pursuant to this embodiment of the present invention, modified MUTEX_EXIT file 114 can be included as a portion of library file 112 and linked into source code 110. The resulting executable code 118 would then include the proper operations to implement this embodiment of the present invention.

FIG. 8 illustrates the logical operations which could be included into the modified MUTEX_EXIT file 114 of FIG. 7. Operation 120 detects the call to the MUTEX_EXIT routine. Decision operation 122 determines if the lock utilized by the MUTEX_EXIT call protects a remote I/O device. Operation 122 can make this determination by examining the address provided with the MUTEX_EXIT call and comparing this address to known remote I/O device addresses. If operation 122 determines that the lock does not relate to a remote I/O device, then operation 124 releases the lock and program control is returned to the original source code.

Otherwise, operation 122 passes control to operation 126, which synchronizes all of the write operations to the remote I/O device which have occurred since the enablement of the lock. For example, synchronization can be implemented by loop operation 128 which waits until the remote I/O device has received all of the data to be stored therein. When all of the write operations have completed then loop operation 128 passes control to operation 124 which releases the mutual exclusion lock, and program control is returned to the source code.

At this point, other nodes in the multiprocessor computing system can now access and write data to the remote I/O device.

While the invention has been particularly shown and described with reference to a preferred embodiment thereof, it will be understood by those skilled in the art that various other changes in the form and details may be made therein without departing from the spirit and scope of the invention.

What is claimed is:

1. In a computing system having a plurality of nodes, each node of said plurality having a plurality of CPUs and memory, at least one node of said plurality having an I/O device connected thereto, a method for maintaining a sequence of store operations to the I/O device performed in said computing system, the method comprising the computer implemented steps of:

identifying in a synchronizer a write operation from a node to write data to the I/O device of a remote node;

synchronizing the write operation to said I/O device by notifying other nodes of the write operation; and preventing the I/O device from receiving a second write operation from a node until said write operation is completed.

2. In a computing system having a plurality of nodes, each node of said plurality having a plurality of CPUs and memory, at least one node of said plurality having an I/O device connected thereto, a method for maintaining a sequence of store operations to the I/O device performed in said computing system, the method comprising the computer implemented steps of:

identifying a request from a node to write data to an I/O device at a remote node, said request having a data field and a virtual address;

extracting from said request said virtual address contained therein;

translating said virtual address to a physical address; and synchronously emulating a data write operation to said I/O device responsive to said request, thereby writing said data field to the I/O device at said physical address.

3. The process of claim 2, wherein said emulating step further comprises the computer implemented steps of:

comparing the physical address obtained from said translating step to the physical address of said I/O device to determine if said virtual address identifies said I/O device;

extracting said data field from said request;

writing said data field to said I/O device; and synchronizing said I/O device to the completion of the data write operation by waiting until the I/O device has received and processed said data field before processing a second request to write data to said I/O device.

4. In a computing system having a plurality of nodes, each node of said plurality having a plurality of CPUs, memory, and a mutual exclusion lock for temporarily preventing access to a location in memory by another node, at least one node of said plurality having an I/O device connected thereto, a method for maintaining a proper sequence of store operations to the I/O device performed in said computing system, the method comprising the computer implemented steps of:

identifying a request from a node to write data to the I/O device, said request having a data field and a virtual address;

writing said data field to the memory specified by said virtual address;

detecting a release access to the mutual exclusion lock;

determining if said mutual exclusion lock protects said I/O device;

if said determining step detects that said mutual exclusion lock is protecting said I/O device, synchronizing said I/O device by waiting until the I/O device has received and processed said data field; and releasing said mutual exclusion lock on said I/O device after said I/O device has received and processed said data field.

* * * * *